(12) United States Patent
Arich de Finetti et al.

(10) Patent No.: US 8,153,757 B2
(45) Date of Patent: Apr. 10, 2012

(54) SOLUTION POLYMERIZATION PROCESS FOR PREPARING POLYOLEFINS

(75) Inventors: Nicolò Arich de Finetti, Ferrara (IT); Daniele Bigiavi, Bologna (IT); Anna Fait, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 0 days.

(21) Appl. No.: 12/735,149

(22) PCT Filed: Dec. 18, 2008

(86) PCT No.: PCT/EP2008/067914
§ 371 (c)(1),
(2), (4) Date: Jun. 18, 2010

(87) PCT Pub. No.: WO2009/080710
PCT Pub. Date: Jul. 2, 2009

(65) Prior Publication Data
US 2010/0267906 A1    Oct. 21, 2010

Related U.S. Application Data

(60) Provisional application No. 61/009,014, filed on Dec. 21, 2007.

(30) Foreign Application Priority Data

Dec. 20, 2007  (EP) ..................... 07150248

(51) Int. Cl.
*C08F 6/00* (2006.01)
*C08F 110/02* (2006.01)

(52) U.S. Cl. .......... 528/501; 526/352; 526/943

(58) Field of Classification Search ............... 528/501
See application file for complete search history.

(56) References Cited

U.S. PATENT DOCUMENTS 3,073,812 A * 1/1963 Henderson ............... 528/501
3,892,690 A   7/1975 Setterstrom
4,686,279 A   8/1987 Nagtzaam et al.
(Continued)

FOREIGN PATENT DOCUMENTS
EP  102122  3/1984
(Continued)

OTHER PUBLICATIONS

U.S. Environmental Protection Agency. Chemical Summary for Cyclohexane Prepared by Office of Pollution Prevention and Toxics. Sep. 1994.*

*Primary Examiner* — Fred M Teskin
*Assistant Examiner* — Elizabeth Eng
(74) *Attorney, Agent, or Firm* — Dilworth IP LLC (57) ABSTRACT

A solution process for polymerizing one or more α-olefins of formula $CH_2=CHR$, where R is H or an alkyl radical $C_{1-12}$, to produce a polyolefin soluble in the reaction medium, the process comprising:
a) polymerizing said one or more α-olefins in a solution phase in the presence of a polymerization catalyst and a inert solvent having a vapor pressure lower than 100 kPa at 20° C.;
b) separating the produced polyolefin from the unreacted monomers and the inert solvent by means of a sequence of at least three volatilization chambers operating at a decreasing pressure, the second devolatilization chamber being operated at a pressure from 0.8 to 5 bar.

10 Claims, 1 Drawing Sheet

U.S. PATENT DOCUMENTS

| | | |
|---|---|---|
| 5,380,822 A | 1/1995 | Skilbeck |
| 5,691,445 A | 11/1997 | Krupinski et al. |
| 7,160,964 B2 | 1/2007 | Bigiavi et al. |
| 7,199,163 B2 | 4/2007 | Bigiavi et al. |
| 7,414,095 B2 | 8/2008 | Penzo et al. |
| 2005/0250917 A1 | 11/2005 | Bigiavi et al. |
| 2009/0043045 A1 | 2/2009 | Resconi et al. |

FOREIGN PATENT DOCUMENTS

| | | |
|---|---|---|
| GB | 1340962 | 12/1973 |
| WO | 04/000891 | 12/2003 |
| WO | 04/000895 | 12/2003 |
| WO | 2005/058979 | 6/2005 |
| WO | 2006/120177 | 11/2006 |

\* cited by examiner

SOLUTION POLYMERIZATION PROCESS FOR PREPARING POLYOLEFINS

This application is the U.S. national phase of International Application PCT/EP2008/067914, filed Dec. 18, 2008, claiming priority to European Patent Application 07150248.8 filed Dec. 20, 2007, and the benefit under 35 U.S.C. 119(e) of U.S. Provisional Application No. 61/009,014, filed Dec. 21, 2007; the disclosures of International Application PCT/EP2008/067914, European Patent Application 07150248.8 and U.S. Provisional Application No. 61/009,014, each as filed, are incorporated herein by reference.

The present invention relates to a process comprising the polymerization in a liquid medium of one or more α-olefins to obtain a polymeric solution, which is successively transferred to a devolatization section, where the unreacted monomers and the polymerization solvent are removed from the obtained polyolefin.

It is known that the solution polymerization of one or more olefins bring to the preparation of a solution of the polyolefin in the reaction medium. The liquid reaction medium comprises the olefin monomers and optionally, depending on the specific α-olefin to be polymerized, an inert hydrocarbon solvent, useful to favor the solubility of the polyolefin in the liquid medium. Highly viscous polymeric solutions are generally discharged from the polymerization reactor, the viscosity being generally comprised between 1000 and 100000 centiPoises.

After the discharge from the polymerization reactor, the polymeric solution has to be transferred to a downstream section, which operates the separation of the obtained polyolefin from the unreacted monomers and the inert solvent. The operability of said separation section is particularly severe, since it requires to be performed at high temperatures to foster the separation of the volatile components from the polymeric solution. The removal of unreacted monomers and inert solvents from the polymeric solution leads to the formation of a polymer melt, i.e. a polymer in the molten state. The heating of the polymeric solution to the high temperatures required in the separation section has to be performed under suitable operative conditions, such to guarantee the segregation of a polymer melt, which can be further processed and treated without particular drawbacks.

Many methods are known in the art to reduce as much as possible the content of unreacted monomers and solvents in a polymer obtained by a solution polymerization process. These methods are mostly used for the continuous removal of volatile components from vinyl aromatic- or styrene-based polymers and involve the heating of the polymeric solution to high temperatures, in the range of 150-250° C., and then flashing the polymer solution inside a single devolatilization chamber. The extent of removal of said volatile compounds can be improved by raising the temperature at which the polymeric solution is introduced inside the devolatilization chamber and by decreasing the pressure in the devolatilization chamber up to vacuum conditions. However, both these options cannot be exploited to the fullest extent: on one hand, the temperature inside the devolatilization chamber must not exceed the limit at which phenomena of thermal degradation of the polymer chains occur. On the other hand, enhancement of the degree of vacuum in the devolatilization chamber involves a marked increase in the volume of the separated gas, so that more complex and bigger vacuum and compression equipment must be provided in the monomer recovery section of the polymerization plant. In view of the above limits, it is difficult to remove with a high efficiency the volatile components contained in a polymer coming from a solution polymerization reactor.

The volatilization of the volatile components may be also fostered by the presence of suitable stripping agents, such as steam, $CO_2$, $N_2$, etc. As an example thereof, U.S. Pat. No. 5,380,822 discloses a process for reducing the amount of residual monomer, dimer, trimer and solvent to less than 500 parts per million in a polymer or a polymer blend containing less than 2% weight of such residual volatile components. The process comprises (i) heating and maintaining said polymer at a temperature ranging from 200 to 270° C., (ii) injecting into said polymer an amount of water greater than the amount of residual monomers and solvent but less than 10% weight, (iii) passing said polymer through a devolatilization chamber maintained at a temperature from 200 to 270° C. and a pressure lower than 8 torr.

U.S. Pat. No. 5,691,445 relates to a process for reducing the amount of residual monomers and solvent to less than 300 parts per million in a polymer or polymer blend of vinyl aromatic monomers, the process being characterized in that the devolatilization is fostered by the injection into the polymer melt of a suitable amount of $CO_2$.

The methods disclosed in U.S. Pat. Nos. 5,380,822 and 5,691,445 show the drawback that in most cases the low molecular weight stripping agents are not easily separable from the unreacted olefin monomers in the monomer recovery section of the polymerization plant. In fact, conventional distillation units are not sufficient to achieve an acceptable separation of the stripping agents from the olefin monomers, so that molecular sieves must be provided in order to complete efficiently said separation. The use of molecular sieves increases the complexity of the process and the operative costs in the monomer recovery section.

The patent application WO 04/000891 describes a method for removing the unreacted 1-butene from a solution of polybutene in 1-butene coming from a solution polymerization reactor. The polymeric solution is first subjected to heating and mixing conditions, so as to form a two-phase mixture consisting of a polybutene melt and supercritical gaseous butene-1, then said two-phase mixture is transferred to a sequence of two devolatilization chambers operated at a decreasing pressure. In particular, the second devolatilization chamber is operated under vacuum conditions.

The polymerization of 1-butene, as known in the art, can occur in the absence of any polymerization inert solvent, since poly-1-butene is completely soluble in the liquid monomer at the usual polymerization conditions, thus leading to the formation of a polymeric solution. However, other alpha-olefins, such as for instance propylene or ethylene, can be polymerized in a solution phase only in the presence of a suitable inert solvent, otherwise the polyolefin is not soluble in the liquid monomer at the usual polymerization conditions. As a consequence, the devolatilization section of the polymerization plant must effect also the removal of the inert solvent from the obtained polyolefin.

Generally, the vapor pressure of the suitable polymerization solvents is lower than the vapor pressure of the polymerized olefins, so that their respective behavior, once subjected to the devolatilization conditions, is considerably different. The method described in WO 04/000891 gives drawbacks if applied to devolatilization of a polymeric solution derived from propylene or ethylene (co)polymerization, due to the excessive amount of polymerization solvent which remains solvated in the polymer melt discharged from the first chamber. In fact, according to WO 04/000891 the second devolatilization chamber is operated under vacuum conditions (5-100 mbar), so that due to presence of solvent solvated in the melt, a multistage vacuum unit with more vacuum pumps in series would be necessary to ensure the requested vacuum degree inside the second chamber: such a multistage vacuum unit would increase considerably the operative costs of the devolatilization section.

In view of the above explanation, it would be desirable to provide a solution polymerization of α-olefins, where both the unreacted monomers and the inert solvents are efficiently removed from the polyolefin obtained from the polymerization reactor.

It is therefore an object of the present invention a solution process for polymerizing one or more α-olefins of formula $CH_2=CHR$, where R is H or an alkyl radical $C_{1-12}$, to produce a polyolefin soluble in the reaction medium, the process comprising:
a) polymerizing said one or more α-olefins in a solution phase in the presence of a polymerization catalyst and an inert hydrocarbon solvent having a vapor pressure at 20° C. of less than 100 kPa;
b) separating the produced polyolefin from the unreacted monomers and the inert hydrocarbon solvent by means of a sequence of at least three volatilization chambers operating at a decreasing pressure, the second volatilization chamber being operated at a absolute pressure from 0.8 to 5 bar.

The polymerization catalyst used in the polymerization step (a) can be a Ziegler-Natta catalyst system and/or a single-site catalyst system comprising a metallocene compound and an alumoxane, as the catalyst activator. The solution polymerization of step a) can be performed in one or more continuously stirred tank reactors or one or more static mixer reactors (SMR). A solution of a polyolefin in the reaction medium is obtained from the polymerization step a). According to present invention the reaction medium comprises the unreacted monomers and an inert hydrocarbon solvent, which has the function of fostering the solubility of the produced polyolefin.

The main monomer of polymerization step a) is propylene or ethylene, which may be polymerized alone or copolymerized with another α-olefin of formula $CH_2=CHR$, where R is hydrogen or a hydrocarbon radical having 1-8 carbon atoms in an amount up to 50% by weight, preferably 0.5-30% by weight, based on the main monomer.

If the main monomer is propylene, the preferred comonomer is selected from ethylene, 1-butene, 1-hexene and 1-octene. If the main monomer is ethylene, the preferred comonomer is selected from propylene, 1-butene, 1-hexene and 1-octene.

Hydrogen can be advantageously used to control the molecular weight of the obtained polyolefins. Different operative conditions can be adopted in polymerization step a) as regards the concentration of the molecular weight regulator, the inert solvent, monomers, and optional comonomers.

The inert hydrocarbon solvents suitably used in the polymerization step a) are selected from those having a vapor pressure lower than the polymerized olefins, in particular a vapor pressure lower than 100 KPa at 20° C., preferably lower than 50 KPa at 20° C. These low values of vapor pressure imply a different behavior, with respect to the olefin monomers, during the volatilization step b).

Taking also into account their good solubilization capacity and their chemical inertia, suitable inert hydrocarbon solvents with the above values of vapor pressure are selected from:
cycloalkanes, such as cyclohexane (vapor pressure 10.4 kPa, 20° C.), methylcyclohexane and cyclopentane (34.5 kPa, 20° C.);
aliphatic hydrocarbons, such as isopentane (75.9 kPa, 20° C.), hexane (16.0 kPa, 20° C.), isohexane, isoheptane, isooctane, isononane and mixtures thereof.
aromatic hydrocarbons, such as toluene, benzene and ethylbenzene.

The most preferred hydrocarbon solvents used in step a) are cyclopentane, cyclohexane and methylcyclohexane.

Depending on selected hydrocarbon solvent and catalyst system, the olefin polymerization of step a) is generally operated at a high temperature, generally in a range from 75 to 140° C., preferably from 90 to 120°, and a high pressure, generally in a range from 18 to 60 bar, preferably from 25 to 40 bar. The residence time of the liquid reaction medium inside the polymerization apparatus is generally comprised between 10 minutes and 240 minutes, preferably between 20 minutes and 120 minutes.

A highly viscous polymeric solution is discharged from the polymerization reactor of step a). The viscosity of the obtained polymeric solution should not exceed a threshold value, as otherwise it becomes extremely difficult stirring and/or processing the polymeric solution downstream the polymerization section. The viscosity of the polymeric solution is generally comprised between 1000 and 100000 centiPoises.

The polymeric solution discharged from the polymerization is transferred, optionally by means of a volumetric pump, to the downstream separation step b), where the unreacted monomers and the inert solvent are removed from the obtained polyolefin particles. According to the invention, said removal of the unreacted monomers and inert solvents is achieved by a melt devolatilization technique, which starting from the polymer solution leads to remove the volatile components from the produced polyolefin, which is separated in the form of a "polymer melt". With the term "polymer melt" is meant an olefin polymer in the molten state: in spite of its very high viscosity (of at least $10^6$ centiPoise), said polymer melt is still able to be pumped by means of a gear pump.

High temperatures, generally in the order of 150-220° C., are required to perform the melt devolatilization technique of step b), so that the polymer solution has to be previously subjected to deactivation of the catalyst components contained therein. The catalyst deactivation avoids a further uncontrolled polymerisation or a thermal degradation of the polymer during the volatilization step b). It avoids also uncontrolled reactions of the catalyst residues that can provide by-products affecting the polymer quality (e.g. color). The deactivation of the polymeric solution can be performed in one or more mixing tanks placed in series or, alternatively, in a single deactivation apparatus equipped with a sequence of more mixing stages. In the case of polymerization carried out in the presence of a Ziegler-Natta catalyst, any of the deactivating compounds known in the art can be employed. Suitable deactivating compounds are water or organic compounds with a boiling point higher than 150° C. and at least a hydroxy group. Examples of preferred deactivating compounds are water, propylenglycol, dipropylenglycol, glycerol.

After the catalyst deactivation, the polymeric solution is subjected to heating by flowing it inside a heat exchanger in order to increase its temperature to values comprised between 120° C. and 250° C., this value of temperature being bound to the volatility of the specific monomers and inert solvents to be recovered in step b). A multi-tube heat exchanger with static mixing elements inserted inside each tube can be used to this purpose, as described in the Patent Application WO 04/000891 in the name of the same Applicant. The presence of a plurality of static mixing elements inside each tube is aimed to achieve an intense mixing of the highly-viscous polymeric solution: said elements cause the mixing between the outermost and the innermost veins of the flowing stream, so as to favour a good heat transfer between the different threads of fluid. As a consequence, a homogenous distribution of temperature is obtained in the polymer solution: mixing rods may be used as static elements inserted in the tubes of the heat exchanger.

The separation step b) of present invention is performed by means of a sequence of at least three volatilization chambers operating at a decreasing pressure. At the outlet from the heat exchanger the polyolefin solution is therefore introduced in the upper portion of a first volatilization chamber, which is operated at a temperature from 120° C. to 250° C. and a pressure from 5 to 20 bar, preferably from 10 to 15 bar.

In this first volatilization chamber the different components of the polyolefin solution are separated: the polyolefin falls downward by gravity as a polymer melt, while the volatile components, mostly olefin monomers and comonomers, are released from the polyolefin as a gaseous stream, which flows upward to the top of the volatilization chamber. During the vertical drop of the polymer melt along the first volatilizer the unreacted (co)monomers are released away, so that at the discharge from the first volatilizer the content of unreacted (co)monomers in the polyolefin melt is generally reduced to less than 5% by weight.

As regards the inert solvent, the content thereof in the above polyolefin melt depends on its vapour pressure and its relative volatility towards the unreacted (co)monomers. Lower is the vapour pressure of the inert solvent with respect to the vapour pressure of the monomers, higher is the amount of inert solvent which remains entrapped inside the polymer melt in a solvated form. For instance, in the case of propylene polymerization using cyclohexane as the inert solvent, due to the low volatility of cyclohexane, a considerable amount thereof remains solvated in the polymer melt collected in the bottom of the first volatilization chamber.

The second devolatilization chamber of step b) of present invention is preferably operated at a higher temperature with respect to the first chamber, so that at the outlet from the first volatilizer the polyolefin melt is generally subjected to further heating in a second multi-tube heat exchanger. This heat exchanger has the function of adjusting the temperature of the polymer melt up to the value requested in the second devolatilization chamber. In particular, the temperature in the second devolatilization chamber is adjusted at a value from 180 to 250° C., while the pressure is maintained close to the atmospheric value, in a range from 0.8 to 5.0 bar, preferably from 1.0 to 3.0 bar. In view of the temperature increase, and above all, due to the considerable decrease of pressure, the residual amounts of olefin (co)monomers and a considerable amount of inert solvent are released from the polyolefin melt as a gaseous stream, which flows upward to the top of the second volatilization chamber. Simultaneously, the polyolefin melt drops by gravity and settles at the bottom of the second volatilizer. In particular, at the discharge from the second volatilizer the content of unreacted monomers in the polyolefin melt is reduced to less than 1% by weight, while the content of the inert solvent is reduced less than 6% by weight.

Successively, the polyolefin melt withdrawn from the second volatilizer is introduced into a third devolatilization chamber, operated at the same temperature range of the second volatilizer, but under vacuum conditions. A vacuum pump is arranged on the line transferring the gaseous components from the top of this volatilizer to the monomer recovery section. Said vacuum pump establishes a high degree of vacuum inside the third chamber, in particular a pressure comprised between 5 and 100 mbar, preferably between 10 and 25 mbar. As a consequence of said vacuum conditions, residual amounts of monomers and inert solvent are released away during the vertical drop and settling of the polyolefin melt along the third volatilization chamber. Accordingly, at the outlet from the third volatilizer the total content of monomers is negligible (generally lower than 50 ppm weight), while the content of inert solvent in the polyolefin melt is strongly reduced, up to less than 500 ppm weight.

The polyolefin melt obtained at the bottom of each volatilizer of step b) is characterized by a very high viscosity, of at least $10^6$ cP. As a consequence, specific pumps, such as gear pumps, are preferably used to guarantee the extraction of the polymer melt from the bottom of each devolatilization chamber. Preferably, the gear pump is directly coupled to the bottom flange of each volatilizer in order to prime the pump and to convey the polyolefin melt to the following process steps.

The gaseous streams collected at the top of each volatilizer may also contain little amounts of other volatile components, such as oligomers, catalyst deactivators and byproducts deriving from the catalyst deactivation, so that the monomer recovery section of the polymerization plant requires the separation of said volatile compounds from the unreacted (co)monomers and the inert solvent. The monomer recovery section comprises one or more distillation columns, a drying unit, and recycle lines of liquid monomers and inert solvents to the polymerization reactor.

The process of the present invention is characterized by an excellent efficiency in the removal of unreacted monomers and inert solvents from polyolefin particles prepared by a solution polymerization of olefins. The minimization of the content of unreacted monomers at the above indicated values dramatically reduces the problems of explosiveness due to the release of olefins, such as propylene, 1-butene incorporated in the final polyolefin pellets. In fact, the presence of non-negligible amounts of monomers requires a massive and long-period ventilation of the pellets during the storage thereof to reduce the risks of explosiveness. The minimization of the monomers content at the above indicated negligible values (generally lower than 50 ppm) allows to avoid said forced ventilation of the pellets during the storage thereof.

Moreover, the minimization of the content of the inert hydrocarbon solvent in the polyolefin particles (less than 500 ppm) reduces the risk of obtaining sticky pellets during the successive pelletization of the polymer particles, thus improving the handling of the obtained pellets.

Figure 1:
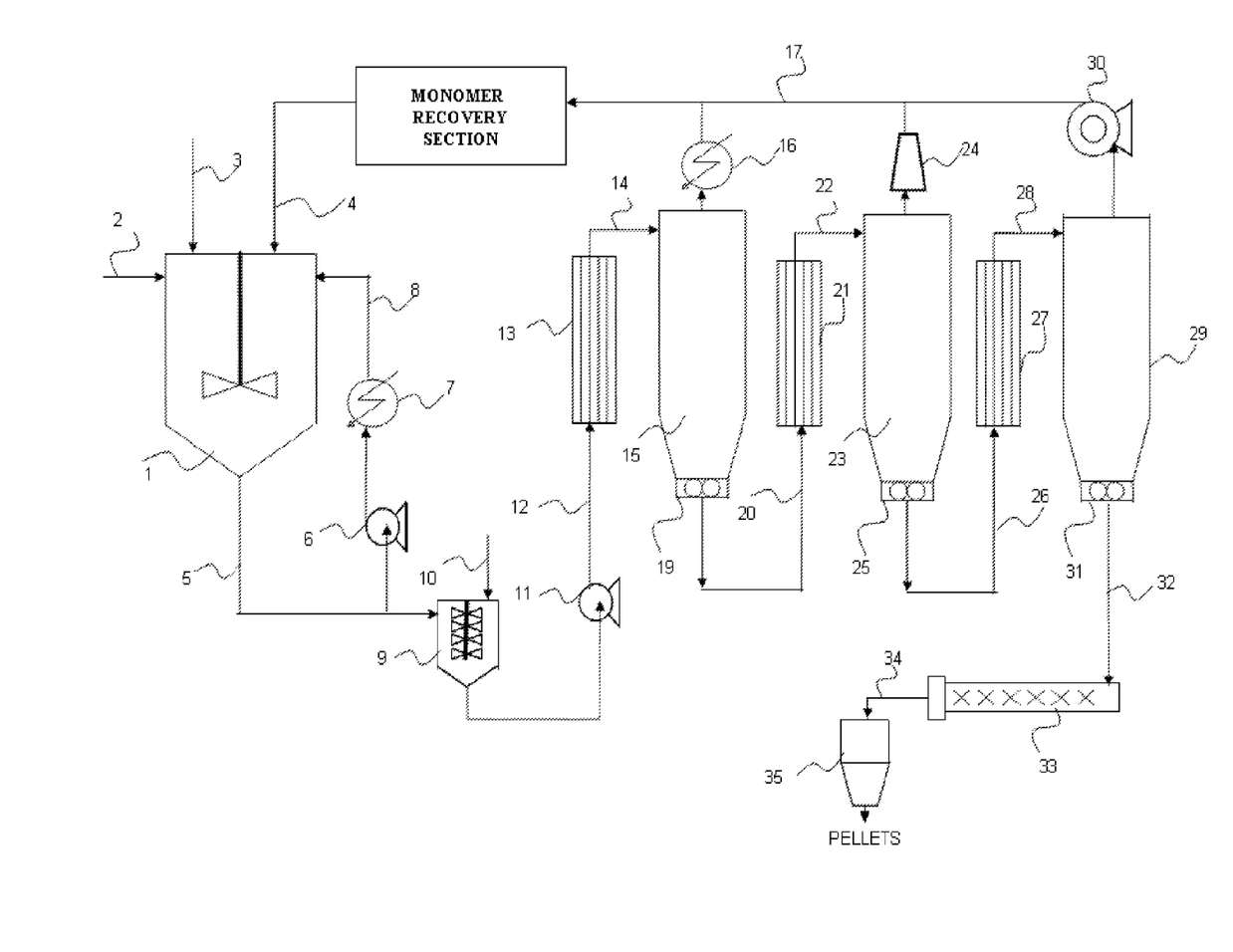

The process of the present invention will now be described in detail with reference to the process setup shown in FIG. 1, referring in particular to a solution process for polymerizing propylene as the main monomer. The process setup of FIG. 1 has to be considered illustrative and not limitative of the scope of the present invention.

The solution polymerization step a) of the present invention is performed in a continuously stirred tank reactor 1. A transition metal compound, optionally supported on a carrier, an aluminum alkyl compound and optionally an electron donor compound are first pre-contacted in one or more pre-contacting pots (not shown) and then fed to the continuously stirred tank reactor 1 via line 2.

A liquid stream containing liquid propylene, optionally comonomers, an inert hydrocarbon solvent, such as cyclohexane, is introduced into the polymerization reactor 1 via line 3. The olefin monomers and the inert hydrocarbon solvent coming from the monomer recovery section are recycled to the reactor 1 via line 4.

The operating conditions in the solution polymerization reactor 1 are selected as above specified in present description: a high-viscosity solution of a propylene (co)polymer in the inert solvent is discharged via line 5 from the reactor 1. A part of the produced polymer solution is fed by a pump 6 to the heat exchanger 7 and then, after suitable cooling, it is continuously recycled via line 8 to the polymerization reactor 1.

The remaining part of polymeric solution discharged from the stirred tank reactor 1 is conveyed to a mixing pot 9, where is contacted with a catalyst deactivator, such as water, which is fed via line 10 in a suitable amount to the mixing pot 9. After the catalyst deactivation, the solution of polypropylene in the inert solvent may be pressurized and transferred by means of a screw pump to the devolatilization step b) of present invention.

The polymeric solution is pumped by a screw pump 11 to the inlet of a heat exchanger 13 via line 12. The heat exchanger 13 is a multi-tube heat exchanger with static mixing elements inserted inside each tube. By means of heat exchanger 13 the temperature of the polymeric solution is increased to the values requested inside the first devolatilization chamber, so as to favor the separation of the unreacted monomers and inert solvent from the polymer.

The polymeric stream exiting from the heat exchanger 13 is introduced via line 14 at the top of a first volatilizer 15, which is operated at a pressure ranging from 5 to 20 bar.

In said first volatilizer 15 the unreacted monomers and the inert solvent are separated from the polymeric components: a polymer melt settles downwards at the bottom of the volatilizer 15, while the unreacted monomers and the inert solvent are realized away from the polymer, flowing upward as a gaseous stream. The gas exiting the top of the volatilizer 15 is subjected to partial condensation in a condenser 16, and then the obtained gas/liquid mixture is transferred via line 17 to the monomer recovery section of the polymerization plant. The monomer recovery section comprises one or more distillation columns to separate the heavy components from the light components, a drying unit, and recycle lines of liquid monomers and inert solvents to the polymerization reactor.

A polymer melt, entrapping a certain amount of inert solvent and residual monomers, is withdrawn by means of a gear pump 19 from the bottom of the first volatilizer 15 and transferred via line 20 into a second multi-tube heat exchanger 21, which adjusts the temperature of the polymer melt at the values requested in the second volatilizer. The polymer melt exiting the heat exchanger 21 is introduced via line 22 at the top of a second volatilizer 23, which is operated at a pressure ranging from 0.8 to 5 bar, said pressure values being set by the compressor 24. In said second volatilizer 23, the residual monomers and inert solvent are realized away from the polymer melt, which settles downwards at the bottom of the volatilizer 23. The unreacted monomers and the inert solvent flow upward along the volatilizer 23: this gaseous stream collects at the top of the volatilizer 23 and is withdrawn by the compressor 24 and transferred via line 17 to the monomer recovery section.

A polymer melt, further purified from the unreacted monomers and the inert solvent, is therefore withdrawn by means of a gear pump 25 from the bottom of the second volatilizer 23 and transferred via line 26 into a third heat exchanger 27, which adjusts the temperature of the melt according to the values requested inside the third volatilizer. The polymer melt exiting the heat exchanger 27 is introduced via line 28 at the top of a third volatilizer 29, which is operated under vacuum at a pressure ranging from 5 to 100 mbar, said pressure values being set by the vacuum pump 30. In said third volatilizer 29, the residual amounts of unreacted monomers and inert solvent are realized away from the polymer melt, which settles downwards at the bottom of the volatilizer 29. The unreacted monomers and the inert solvent flow upward along the volatilizer 29: this gaseous stream collects at the top of the volatilizer 29 and is withdrawn by the vacuum pump 30 and transferred via line 17 to the monomer recovery section.

The polymer melt withdrawn by means of a gear pump 31 from the bottom of the third volatilizer 29 is conveyed via line 32 into a static mixer 33 to be subjected to extrusion. The static mixer 33 has the function of mixing the polymer melt with suitable additives, such as antioxidant compounds, nucleating agents, pigments, etc.

A side-arm extruder (not shown) can be used for melting and mixing each other the additives used for the polyolefin compounding. The compounded propylene (co)polymer exiting the static mixer 33 is then passed via line 34 to an underwater pelletizer 35, where it is cut into pellets by the action of rotating knife blades: the pellets are then cooled by means of cooling water.

The olefin monomers polymerized by the process of the invention have formula $CH_2=CHR$, where R is hydrogen or a hydrocarbon radical having 1-12 carbon atoms.

Examples of polyolefins that can be obtained are elastomeric terpolymers of ethylene and propylene with minor proportions of diene, or elastomeric copolymers of ethylene and propylene with a content of units derived from ethylene from about 30 to 70% by weight;

mainly isotactic polypropylene and copolymers of propylene and ethylene and/or other $\alpha$-olefins having a content of units derived from propylene of more than 85% by weight;

ethylene copolymers with propylene or other $\alpha$-olefins having a content of units derived from ethylene lower than 90% by weight;

mainly isotactic copolymers of propylene and $\alpha$-olefins, such as 1-butene, with an $\alpha$-olefin content lower than 30% by weight;

atactic polypropylene and amorphous copolymers of propylene and ethylene and/or other $\alpha$-olefins containing more than 70% by weight of units derived from propylene.

The solution polymerization of olefins herewith described is not restricted to the use of any particular family of polymerization catalysts. The invention is useful in any exothermic polymerization reaction employing any catalyst, whether it is supported or unsupported, and regardless of whether it is in pre-polymerized form.

The polymerization reaction can be carried out in the presence of highly active catalytic systems, such as Ziegler-Natta catalysts, single site catalysts, chromium-based catalysts, vanadium-based catalysts.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_nX_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide in active form which is preferably $MgCl_2$ in active form. Particularly for the preparation crystalline polymers of $CH_2CHR$ olefins, where R is a C1 C10 hydrocarbon group, internal electron donor compounds can be supported on the $MgCl_2$. Typically, they can be selected among esters, ethers, amines, and ketones. In particular, the use of compounds belonging to 1,3-diethers, cyclic ethers, phthalates, benzoates, acetates and succinates is preferred.

It is also possible to use, besides the electron-donor present in the solid catalytic component, an external electron-donor (ED) added to the aluminium alkyl co-catalyst component or to the polymerization reactor. These external electron donors can be selected among alcohols, glycols, esters, ketones, amines, amides, nitriles, alkoxysilanes and ethers. The electron donor compounds (ED) can be used alone or in mixture with each other. Preferably the ED compound is selected among aliphatic ethers, esters and alkoxysilanes. Preferred ethers are the C2-C20 aliphatic ethers and in particular the cyclic ethers preferably having 3-5 carbon atoms, such as tetrahydrofurane (THF), dioxane.

Preferred esters are the alkyl esters of C1-C20 aliphatic carboxylic acids and in particular C1-C8 alkyl esters of aliphatic mono carboxylic acids such as ethylacetate, methyl formiate, ethylformiate, methylacetate, propylacetate, i-propylacetate, n-butylacetate, i-butylacetate.

The preferred alkoxysilanes are of formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl.

Other useful catalysts are the vanadium-based catalysts, which comprise the reaction product of a vanadium compound with an aluminum compound, optionally in the presence of a halogenated organic compound. Optionally the vanadium compound can be supported on an inorganic carrier, such as silica, alumina, magnesium chloride. Suitable vanadium compounds are $VCl_4$, $VCl_3$, $VOCl_3$, vanadium acetyl acetonate.

Other useful catalysts are those based on chromium compounds, such as chromium oxide on silica, also known as Phillips catalysts.

Other useful catalysts are single site catalysts, for instance metallocene-based catalyst systems which comprise:

at least a transition metal compound containing at least one π bond;

at least an alumoxane or a compound able to form an alkyl-metallocene cation; and optionally an organo-aluminum compound.

A preferred class of metal compounds containing at least one π bond are metallocene compounds belonging to the following formula (I):

wherein M is a transition metal belonging to group 4, 5 or to the lanthanide or actinide groups of the Periodic Table of the Elements; preferably M is zirconium, titanium or hafnium;

the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms; preferably, the substituents X are selected from the group consisting of —Cl, —Br, -Me, -Et, -n-Bu, -sec-Bu, -Ph, -Bz, —CH$_2$SiMe$_3$, —OEt, —OPr, —OBu, —OBz and —NMe$_2$;

p is an integer equal to the oxidation state of the metal M minus 2;

n is 0 or 1; when n is 0 the bridge L is not present;

L is a divalent hydrocarbon moiety containing from 1 to 40 carbon atoms, optionally containing up to 5 silicon atoms, bridging Cp and A, preferably L is a divalent group $(ZR^7_2)_n$; Z being C, Si, and the $R^7$ groups, equal to or different from each other, being hydrogen or a hydrocarbon radical containing from 1 to 40 carbon atoms;

more preferably L is selected from $Si(CH_3)_2$, $SiPh_2$, $SiPhMe$, $SiMe(SiMe_3)$, $CH_2$, $(CH_2)_2$, $(CH_2)_3$ or $C(CH_3)_2$;

Cp is a substituted or unsubstituted cyclopentadienyl group, optionally condensed to one or more substituted or unsubstituted, saturated, unsaturated or aromatic rings;

A has the same meaning of Cp or it is a $NR^7$, —O, S, moiety wherein $R^7$ is a hydrocarbon radical containing from 1 to 40 carbon atoms;

Alumoxanes used as component b) are considered to be linear, branched or cyclic compounds containing at least one group of the type:

wherein the substituents U, same or different, are defined above.

In particular, alumoxanes of the formula:

can be used in the case of linear compounds, wherein $n^1$ is 0 or an integer of from 1 to 40 and where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number; or alumoxanes of the formula:

can be used in the case of cyclic compounds, wherein $n^2$ is an integer from 2 to 40 and the U substituents are defined as above.

The catalyst may suitably be employed in the form of a pre-polymer powder prepared beforehand during a pre-polymerization stage with the aid of a catalyst as described above. The pre-polymerization may be carried out by any suitable process, for example, polymerization in a liquid hydrocarbon diluent or in the gas phase using a batch process, a semi-continuous process or a continuous process.

The following examples have to be considered representative and non-limiting of the scope of the invention.

EXAMPLES

Example 1

Preparation of the Catalyst System

The catalyst system is based on the metallocene compound "racemic-dimethylsilylbis(2-methyl-4-(4-tert-butylphenyl)-1,5,6,7-tetrahydro-s-indacen-1-yl)dichlorozirconium".

2700 g of TIBA/isododecane solution (90 g/L) and 670 mL of MAO/toluene solution were mixed in a 12 L thermostated autoclave. After 1 h of stirring at 50° C., 6.57 g of the above indicated metallocene compound (previously suspended in 50 mL of toluene) were added to the MAO/TIBA solution. The resulting mixture was stirred for additional 45 min at room temperature, then 4400 g of isododecane were added and after additional 10 min stirring, the mixture was filtered to finally give an orange solution (concentration=53 $g_{TOT}$/L and 0.65 $g_{metallocene}$/L, MAO/TIBA=1.99 molar, $Al_{TOT}$/Zr=629 molar, based on the elemental analysis of the catalytic solution).

Polymerization—Step a)

The polymerization of ethylene and butene-1 is performed in a solution phase in a continuous stirred tank reactor by means of the above indicated catalyst system.

Cyclohexane (vapor pressure of 10.4 kPa at 20° C.) is used as the polymerization solvent, $H_2$ is used as a molecular weight regulator. The polymerization conditions, selected in such a way that the reacting system is one liquid-phase, are reported in Table 1, which also reports the solution composition and the polyolefin concentration in the polymerization solution.

TABLE 1

| Polymerization conditions | |
| --- | --- |
| Temperature (° C.) | 117° C. |
| Pressure (bar) | 39 |
| Residence Time (min) | 128 |
| Solution composition | |
| Ethylene (% weight) | 5.8 |
| Butene-1 (% weight) | 15.9 |
| Cyclohexane (% weight) | 77.6 |
| $H_2$ (ppm mol) | 614 |
| Polymer concentration (% weight) | 22 |

A polymeric solution containing an ethylene/butene-1 copolymer at a concentration of 22% wt is withdrawn from the polymerization reactor and is transferred by means of a screw pump to the separation step b) of the present invention, performed in a sequence of three volatilization chambers operated at a decreasing pressure.

Separation and Monomer Recovery—Step b)

The polymeric solution is introduced into the first volatilization chamber, wherein the ethylene/butene-1 copolymer in the form of a polymer melt settles by gravity to the bottom of the chamber. Simultaneously, the unreacted monomers and partially cyclohexane are released away from the polymer melt and flow upward to the top of the chamber, from which they are withdrawn and conveyed to the monomer recovery section, as shown in FIG. 1.

The polymer melt is discharged from the bottom of the first volatilizer and is introduced into a heat exchanger in order to raise its temperature up to the value requested into the second volatilization chamber. Likewise the polymer melt settles by gravity to the bottom of the second volatilization chamber releasing away considerable amounts of unreacted monomers and cyclohexane.

Finally the polymer melt coming from the second volatilization chamber is introduced into the third volatilization chamber, which is operated under vacuum pressure. Likewise the polymer melt settles by gravity to the bottom of the third volatilization chamber releasing away further amounts of unreacted monomers and cyclohexane.

The top and bottom temperature, as well as the operating pressure in each volatilization chamber are reported in Table 2, which also shows the residual content of ethylene, butene-1 and cyclohexane inside the polymer melt discharged from each volatilization chamber.

TABLE 2

| | T (° C.) | | Pressure | $C_2H_4$/melt | $C_4H_8$/melt | Cyclohexane/melt |
| --- | --- | --- | --- | --- | --- | --- |
| | Top | Bottom | | | | |
| $1^{st}$ Devoly chamber | 178 | 161 | 8 bar | 0.25% wt | 2.54% wt | 50.41% wt |
| $2^{nd}$ Devoly chamber | 181 | 197 | 2.5 bar | 400 ppm wt | 0.042% wt | 3.37% wt |
| $3^{rd}$ Devoly chamber | 187 | 204 | 21 mbar | 5 ppm wt | 25 ppm wt | 420 ppm wt |

Table 2 demonstrates that the process of the invention allows to separate with a high efficiency ethylene, butene-1 and cyclohexane from ethylene/butene-1 copolymer previously produced in the polymerization step a). At the outlet of the third devolatilization chamber the content of unreacted monomers in the polymer melt is negligible, while the content of cyclohexane in the polymer melt is of only 420 ppm weight.

The polymer melt coming from the $3^{rd}$ devolatilization chamber is successively compounded inside an extruder and then is transferred to an underwater pelletizer. The Melt Index MIE (ASTM D 1238, condition E) of the obtained pellets is 0.8, while the amount of butene-1 bounded to the copolymer is 34% by weight.

Example 2

Polymerization—Step a)

The same catalyst system of Example 1 is used.

The polymerization of ethylene and butene-1 is performed in a solution phase in a continuous stirred tank reactor by means of the above indicated catalyst system.

Cyclohexane is used as the polymerization solvent, $H_2$ is used as a molecular weight regulator. The polymerization conditions, selected in such a way that the reacting system is one liquid-phase, are reported in Table 3, which also reports the solution composition and the polyolefin concentration in the polymerization solution.

TABLE 3

| Polymerization conditions | |
|---|---|
| Temperature (° C.) | 115 |
| Pressure (bar) | 39 |
| Residence Time (min) | 140 |
| Solution composition | |
| Ethylene (% weight) | 6.8 |
| Butene-1 (% weight) | 4.9 |
| Cyclohexane (% weight) | 88.8 |
| $H_2$ (ppm mol) | 3669 |
| Polymer concentration (% weight) | 18 |

A polymeric solution containing an ethylene/butene-1 copolymer at a concentration of 18% wt is withdrawn from the polymerization reactor and is transferred by means of a screw pump to the separation step b) of the present invention, performed in a sequence of three volatilization chambers operated at a decreasing pressure.

Separation and Monomer Recovery—Step b)

The polymeric solution is introduced into the first volatilization chamber, wherein the ethylene/butene-1 copolymer in the form of a polymer melt settles by gravity to the bottom of the chamber. Simultaneously, the unreacted monomers and partially cyclohexane are released away from the polymer melt and flow upward to the top of the chamber, from which they are withdrawn and conveyed to the monomer recovery section, as shown in FIG. 1.

The polymer melt is discharged from the bottom of the first volatilizer and is introduced into a heat exchanger in order to raise its temperature up to the value requested into the second volatilization chamber. Likewise the polymer melt settles by gravity to the bottom of the second volatilization chamber releasing away considerable amounts of unreacted monomers and cyclohexane.

Finally the polymer melt coming from the second volatilization chamber is introduced into the third volatilization chamber, which is operated under vacuum pressure. Likewise the polymer melt settles by gravity to the bottom of the third volatilization chamber releasing away further amounts of unreacted monomers and cyclohexane.

The top and bottom temperature, as well as the operating pressure in each volatilization chamber are reported in Table 4, which also shows the residual content of ethylene, butene-1 and cyclohexane inside the polymer melt discharged from each volatilization chamber.

TABLE 4

| | T (° C.) | | | | | Cyclohexane/ |
| | Top | Bottom | Pressure | $C_2H_4$/melt | $C_4H_8$/melt | melt |
|---|---|---|---|---|---|---|
| $1^{st}$ Devoly chamber | 187 | 170 | 9 bar | 0.28% wt | 1.8% wt | 52.3% wt |
| $2^{nd}$ Devoly chamber | 177 | 197 | 2.8 bar | 520 ppm wt | 0.024% wt | 3.56% wt |
| $3^{rd}$ Devoly chamber | 186 | 203 | 16 mbar | 8 ppm wt | 19 ppm wt | 470 ppm wt |

Table 4 demonstrates that the process of the invention allows to separate with a high efficiency ethylene, butene-1 and cyclohexane from ethylene/butene-1 copolymer previously produced in the polymerization step a). At the outlet of the third devolatilization chamber the content of unreacted monomers in the polymer melt is negligible, while the content of cyclohexane in the polymer melt is of only 470 ppm weight.

The polymer melt coming from the $3^{rd}$ devolatilization chamber is successively compounded inside an extruder and then is transferred to an underwater pelletizer. The Melt Index MIE (ASTM D 1238, condition E) of the obtained pellets is 0.5, while the amount of butene-1 bounded to the polymer is 17% by weight.

Example 3

Polymerization—Step a)

The same catalyst system of Example 1 is used. The polymerization of propylene and ethylene is performed in a solution phase in a continuous stirred tank reactor by means of the above indicated catalyst system.

Cyclohexane is used as the polymerization solvent, $H_2$ is used as a molecular weight regulator. The polymerization conditions, selected in such a way that the reacting system is one liquid-phase, are reported in Table 5, which also reports the solution composition and the polyolefin concentration in the polymerization solution.

TABLE 5

| Polymerization conditions | |
|---|---|
| Temperature (° C.) | 101 |
| Pressure (bar) | 38 |
| Residence Time (min) | 114 |
| Solution composition | |
| Ethylene (% weight) | 2.2 |
| Propylene (% weight) | 23.1 |
| Cyclohexane (% weight) | 74.2 |
| $H_2$ (ppm mol) | 776 |
| Polymer concentration (% weight) | 21 |

A polymeric solution containing a propylene/ethylene copolymer at a concentration of 21% wt is withdrawn from the polymerization reactor and is transferred by means of a screw pump to the separation step b) of the present invention, performed in a sequence of at least three volatilization chambers operated at a decreasing pressure.

Separation and Monomer Recovery—Step b)

The polymeric solution is introduced into the first volatilization chamber, wherein the propylene/ethylene copolymer in the form of a polymer melt settles by gravity to the bottom of the chamber. Simultaneously, the unreacted monomers are subjected to evaporation and flow upward up to the top of the chamber, from which they are discharged and conveyed to the monomer recovery section, as shown in FIG. 1.

Analogously to the description reported in Examples 1 and 2, the polymer melt discharged from the bottom of the first volatilizer is then transferred into the second volatilization chamber and successively the polymer melt coming from the second volatilization chamber is introduced into the third volatilization chamber operated under vacuum pressure.

The top and bottom temperature, as well as the operating pressure in each volatilization chamber are reported in Table 6, which also shows the residual content of ethylene, propylene and cyclohexane inside the polymer melt discharged from each volatilization chamber.

TABLE 6

| | T (° C.) | | Pressure | $C_2H_4$/melt | $C_3H_6$/melt | cyclohexane/melt |
|---|---|---|---|---|---|---|
| | Top | Bottom | | | | |
| 1st Devoly chamber | 184 | 191 | 9.1 bar | 0.28% wt | 1.2% wt | 51.3% wt |
| 2nd Devoly chamber | 196 | 215 | 1.25 bar | 490 ppm wt | 0.012% wt | 2.7% wt |
| 3rd Devoly chamber | 157 | 174 | 19 mbar | 6 ppm wt | 17 ppm wt | 380 ppm wt |

Table 6 demonstrates that the process of the invention allows to separate with a high efficiency ethylene, propylene and cyclohexane from the propylene/ethylene copolymer previously produced in the polymerization step a). At the outlet of the third devolatilization chamber the content of ethylene and propylene in the polymer melt is negligible, while the content of cyclohexane in the polymer melt is of only 380 ppm weight.

The polymer melt coming from the 3rd devolatilization chamber is successively compounded inside an extruder and then is transferred to an underwater pelletizer.

The Melt Index MIL (ASTM D-1238, condition L) of the obtained pellets is 7.3, while the amount of ethylene bounded to the copolymer is 20.7% by weight.

Example 4

Polymerization—Step a)

The same catalyst system of Example 1 is used. The polymerization of ethylene and octene-1 is performed in a solution phase in a continuous stirred tank reactor by means of the above indicated catalyst system.

Cyclohexane is used as the polymerization solvent, $H_2$ is used as a molecular weight regulator. The polymerization conditions, selected in such a way that the reacting system is one liquid-phase, are reported in Table 7, which also reports the solution composition and the polyolefin concentration in the polymerization solution.

TABLE 7

| Polymerization conditions | |
|---|---|
| Temperature (° C.) | 111 |
| Pressure (bar) | 38 |
| Residence Time (min) | 138 |
| Solution composition | |
| Ethylene (% weight) | 6.3 |
| Octene-1 (% weight) | 6.9 |
| Cyclohexane (% weight) | 86.8 |
| $H_2$ (ppm mol) | 584 |
| Polymer concentration (% weight) | 16 |

A polymeric solution containing an ethylene/octene copolymer at a concentration of 16% wt is withdrawn from the polymerization reactor and is transferred by means of a screw pump to the separation step b) of the present invention, performed in a sequence of at least three volatilization chambers operated at a decreasing pressure.

Separation and Monomer Recovery—Step b)

The polymeric solution is introduced into the first volatilization chamber, wherein the ethylene/octene copolymer in the form of a polymer melt settles by gravity to the bottom of the chamber. Simultaneously, the unreacted monomers and partially cyclohexane are subjected to evaporation and flow upward up to the top of the chamber, from which they are discharged and conveyed to the monomer recovery section, as shown in FIG. 1.

Analogously to the description reported in the previous examples, the polymer melt discharged from the bottom of the first volatilizer is transferred into the second volatilization chamber and successively the polymer melt coming from the second volatilization chamber is introduced into the third volatilization chamber operated under vacuum pressure.

The top and bottom temperature, as well as the operating pressure in each volatilization chamber are reported in Table 8, which also shows the residual content of ethylene, octene and cyclohexane inside the polymer melt discharged from each volatilization chamber.

TABLE 8

| | T (° C.) | | Pressure | C$_2$H$_4$/melt | C$_8$H$_{16}$/melt | Cyclohexane/melt |
|---|---|---|---|---|---|---|
| | Top | Bottom | | | | |
| 1$^{st}$ Devoly chamber | 201 | 180 | 9.1 bar | 0.17% wt | 13.29% wt | 38.11% wt |
| 2$^{nd}$ Devoly chamber | 182 | 201 | 2.2 bar | 430 ppm wt | 1.33% wt | 3.00% wt |
| 3$^{rd}$ Devoly chamber | 188 | 208 | 8 mbar | 7 ppm wt | 72 ppm wt | 429 ppm |

Table 8 demonstrates that the process of the invention allows to separate with a high efficiency ethylene, octene and cyclohexane from the ethylene/octene copolymer previously produced in the polymerization step a). At the outlet of the third devolatilization chamber the content of ethylene in the polymer melt is negligible, the content of octene is reduced to 72 ppm, while the content of cyclohexane is only 429 ppm weight.

The polymer melt coming from the 3$^{rd}$ devolatilization chamber is successively compounded inside an extruder and then is transferred to an underwater pelletizer.

The Melt Index MIE (ASTM D-1238, condition E) of the obtained pellets is 0.5, while the amount of octene bounded to the copolymer is 22.3% by weight.

The invention claimed is:

1. A solution process for polymerizing at least one α-olefin of formula CH$_2$=CHR, where R is H or an alkyl radical C$_{1-12}$, to produce a polyolefin soluble in a reaction medium comprising olefin monomers, the process comprising:
    a) polymerizing said at least one α-olefin in a solution phase in the presence of a polymerization catalyst and an inert hydrocarbon solvent having a vapor pressure lower than 100 kPa at 20° C.; and
    b) separating the produced polyolefin from the olefin monomers and the inert hydrocarbon solvent by means of a sequence of at least three devolatilization chambers operating at decreasing pressures, the second devolatilization chamber being operated at a pressure of from 0.8 to 5 bar and a temperature of from 180 to 250° C.

2. The process according to claim 1, wherein the polymerization step a) is performed in at least one continuously stirred tank reactor or at least one static mixer reactor.

3. The process according to claim 1, wherein the polymerization of step a) is operated at a temperature ranging from 75 to 140° C. and a pressure ranging from 18 to 60 bar.

4. The process according to claim 1, wherein the vapor pressure of said inert hydrocarbon solvent is lower than 50 kPa at 20° C.

5. The process according to claim 1, wherein said inert hydrocarbon solvent is selected from cyclohexane, methylcyclohexane, cyclopentane, isopentane, hexane, isohexane, isoheptane, isooctane, isononane, toluene, benzene or ethylbenzene.

6. The process according to claim 5, wherein said inert hydrocarbon solvent is selected from cyclopentane, cyclohexane or methylcyclohexane.

7. The process according to claim 1, wherein the main monomer of step a) is selected from propylene or ethylene, which may be polymerized alone or copolymerized with another α-olefin of formula CH$_2$=CHR, where R is hydrogen or a hydrocarbon radical having 1-8 carbon atoms in an amount up to 50% by weight based on said main monomer.

8. The process according to claim 1, wherein the first volatilization chamber of step b) is operated at a temperature of from 120° C. to 250° C. and a pressure of from 5 to 20 bar.

9. The process according to claim 1, wherein said second volatilization chamber of step b) is operated at a pressure in a range from 1.0 to 3.0 bar.

10. The process according to claim 1, wherein the third devolatilization chamber of step b) is operated at a pressure between 5 and 100 mbar.

* * * * *